United States Patent
Viegener

(10) Patent No.: US 6,581,983 B1
(45) Date of Patent: Jun. 24, 2003

(54) FITTING OR MOUNTING FOR PRODUCING A PRESS JOINT WITH AN INSERTED TUBE END

(75) Inventor: Walter Viegener, Atendorn (DE)

(73) Assignee: Franz Viegener II GmbH & Co. KG, Attendorn (DE)

( * ) Notice: Subject to any disclaimer, the term of this patent is extended or adjusted under 35 U.S.C. 154(b) by 0 days.

(21) Appl. No.: 09/959,012

(22) PCT Filed: Jul. 15, 2000

(86) PCT No.: PCT/EP00/06777

§ 371 (c)(1),
(2), (4) Date: Oct. 17, 2001

(87) PCT Pub. No.: WO01/63160

PCT Pub. Date: Aug. 30, 2001

(30) Foreign Application Priority Data

Feb. 21, 2000 (DE) .......................... 100 07 914

(51) Int. Cl.⁷ .............................. F16L 13/14
(52) U.S. Cl. ................. 285/382; 285/379; 285/93; 285/13
(58) Field of Search .................. 285/93, 379, 382, 285/256, 382.1, 382.2, 13, 14

(56) References Cited

U.S. PATENT DOCUMENTS

| | | | | | |
|---|---|---|---|---|---|
| 1,848,198 A | * | 3/1932 | Reid | .......................... | 285/382 |
| 1,901,820 A | * | 3/1933 | Parker | ......................... | 285/93 |
| 3,210,102 A | * | 10/1965 | Joslin | ....................... | 285/382.2 |
| 4,130,302 A | | 12/1978 | Mitchell et al. | | |
| 4,344,461 A | * | 8/1982 | Beune et al. | ................. | 285/379 |
| 4,834,430 A | * | 5/1989 | Vassallo et al. | .............. | 285/379 |
| 4,902,049 A | * | 2/1990 | Umehara | ..................... | 285/382 |
| 5,484,174 A | * | 1/1996 | Gotoh et al. | .............. | 285/382.2 |
| 5,927,763 A | * | 7/1999 | Mehr | ....................... | 285/382.1 |
| 6,260,891 B1 | | 7/2001 | Foering et al. | | |
| 6,340,181 B1 | * | 1/2002 | Amatsutsu | ................... | 285/321 |

FOREIGN PATENT DOCUMENTS

| | | |
|---|---|---|
| DE | 297 06 408 U1 | 7/1997 |
| DE | 197 22 935 C1 | 7/1998 |
| DE | 298 13 935 U1 | 11/1998 |
| DE | 299 15 400 U1 | 1/2000 |
| EP | 0 343 395 A2 | 11/1989 |
| EP | 0 343 395 B1 | 11/1989 |
| EP | 0 870 964 A1 | 10/1998 |
| JP | 08226582 A | 9/1996 |
| JP | 8-226582 | 9/1996 |
| WO | WO 97/42440 | 11/1997 |
| WO | WO/98 11377 | 3/1998 |

* cited by examiner

Primary Examiner—Eric K. Nicholson
Assistant Examiner—David E. Bochna
(74) Attorney, Agent, or Firm—Barnes & Thornburg

(57) ABSTRACT

A fitting or a mounting part, particularly for the connection with a tube-shaped component, comprises an end section, which can be pressed together for establishing a connection. At the end section, a ring-shaped elevation is arranged in which a sealing ring is disposed. According to the invention, a bulge is provided on the elevation. By means of the bulge, a space is formed between the sealing ring and the wall of the end section, such that a fluid can flow between the tube-shaped components. Only by pressing together this leaky point, will a sealed-off connection arrangement be established.

14 Claims, 8 Drawing Sheets

FITTING OR MOUNTING FOR PRODUCING A PRESS JOINT WITH AN INSERTED TUBE END

The invention relates to a fitting or a mounting part. Such a fitting or such a mounting part comprises a connection piece for receiving a tube end. For establishing a pressed connection, the connection piece with the tube is cold-formed by a pressing tool.

In order to be able to recognize that a point to be pressed has not yet been pressed together, this point should have an intentional leakiness until it has definitively been pressed together.

It is therefore an object of the present invention to provide a fitting or a mounting part by means of which the above-mentioned effect is achieved.

This object is achieved by means of a fitting or mounting part having a ring shaped elevation with at least one bulge on the end section of the fitting. A sealing ring is in the bulge. If one or several bulges are provided on the ring-shaped elevation, by means of which bulges a leaky spot can be produced between the two tube-shaped components, the pressing-together cannot be unnoticed because a fluid situated in the components will flow to the outside. It is only by the pressing-together that the bulge is shaped back such that the leakiness is eliminated. The thus established connection arrangement has a minimum of components. Furthermore, the fitting or mounting part with the bulge is easy to produce because the bulge can be produced in the deformable end section by means of a simple stamping operation. No high-expenditure devices are therefore required for producing the leakiness.

According to an advantageous further development of the invention, a distance between the sealing ring and the wall of the end section is provided in the area of the bulge. As a result, it is ensured that, also at a minimal pressure within the tube-shaped component, a faulty pressing-together will be noticed.

The bulge is preferably shaped radially toward the outside with respect to the elevation. As a result, the bulge can be pressed inward during the pressing-together so that the end section in the area of the bulge rests tightly against the sealing ring. This permits the use of standard tools which are currently used for establishing pressed connections. In addition, in the unpressed condition, the sealing ring maintains it ring shape so that the interior tube-shaped component can be slid without any problem into the fitting or the mounting part.

As an alternative, it is possible to shape a bulge radially toward the inside with respect to the elevation. This construction has the advantage that the sealing ring is deformed which can also be detected when only looking at the tube from the inside. In addition, a slight resistance will be noticeable during the insertion of the interior tube which reminds the user of the pressing-together.

The bulge can easily be produced by a stamp which has, for example, a spherical section. Thus, the bulge also has a spherical shape, and sharp edges which may cause damage are therefore avoided.

Other objects, aspects and novel features of the present invention will become apparent from the following detailed description of the invention when considered in conjunction with the accompanying drawings.

DETAILED DESCRIPTION OF THE PREFERRED EMBODIMENTS

Figure 1A:
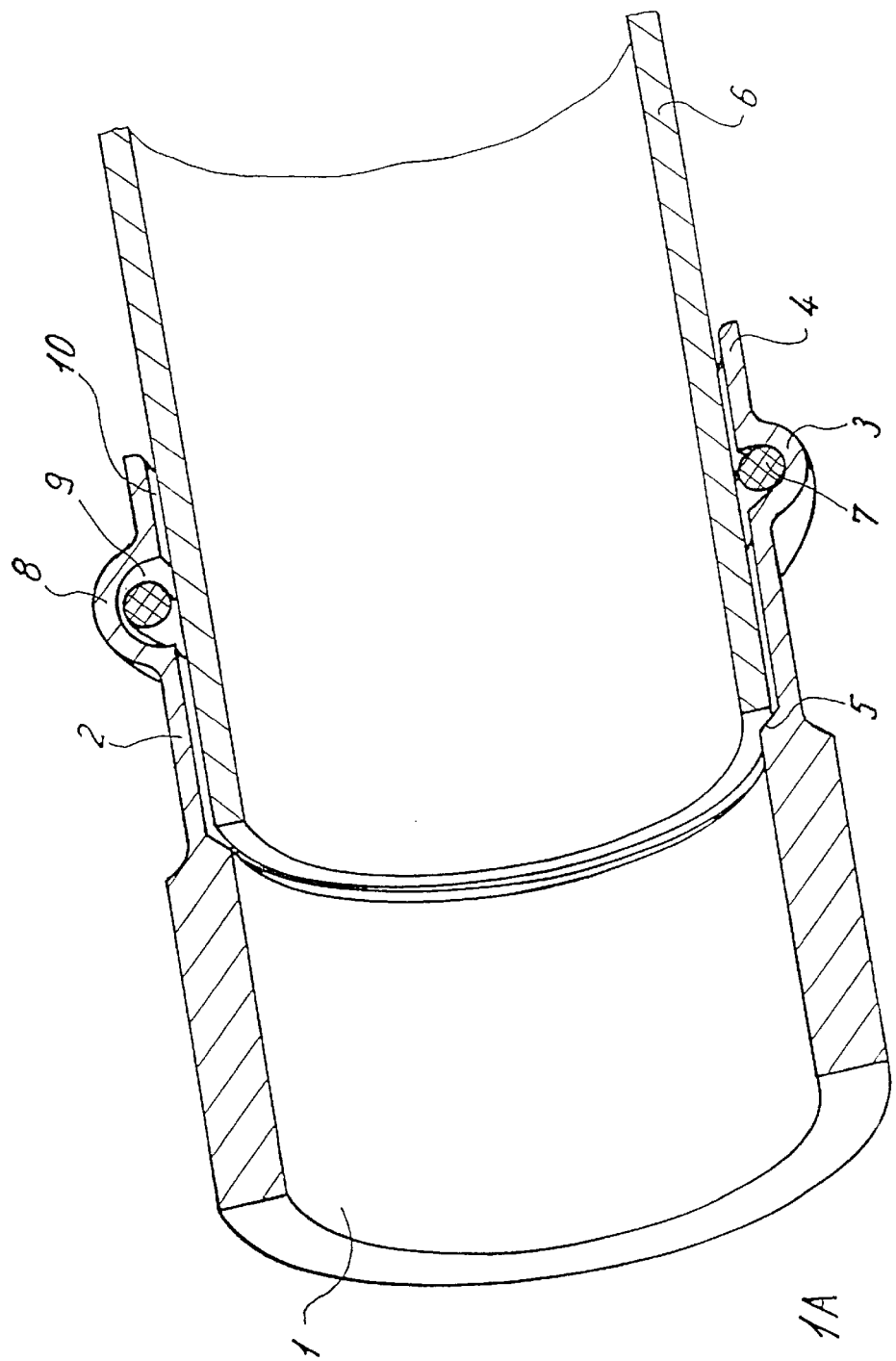
FIG. 1A is a perspective sectional views of a first embodiment of a fitting or a mounting part according to the invention for establishing a connection arrangement, in the unpressed condition.
Figure 1C:
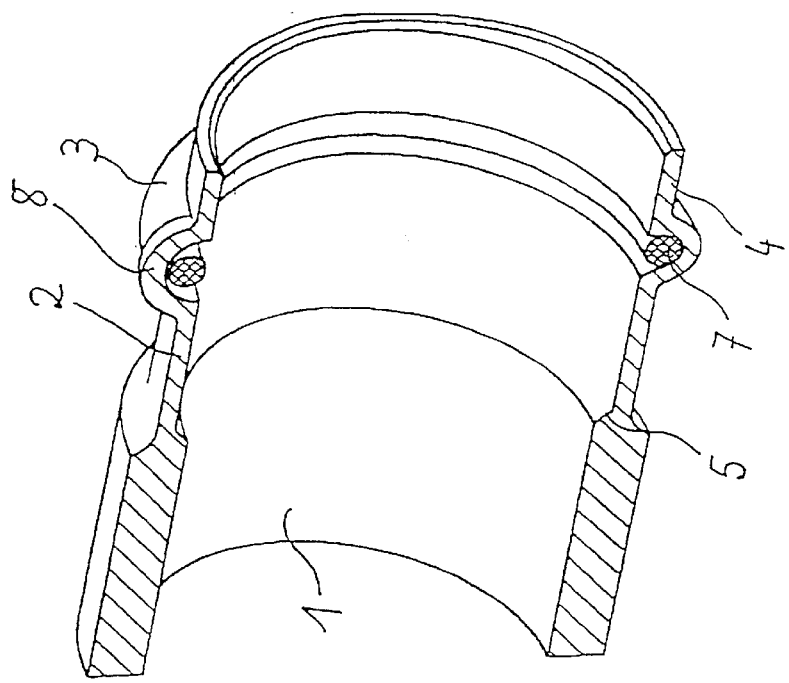
FIG. 1C is a perspective sectional view of the fitting or of the mounting part of FIG. 1A.
Figure 1B:
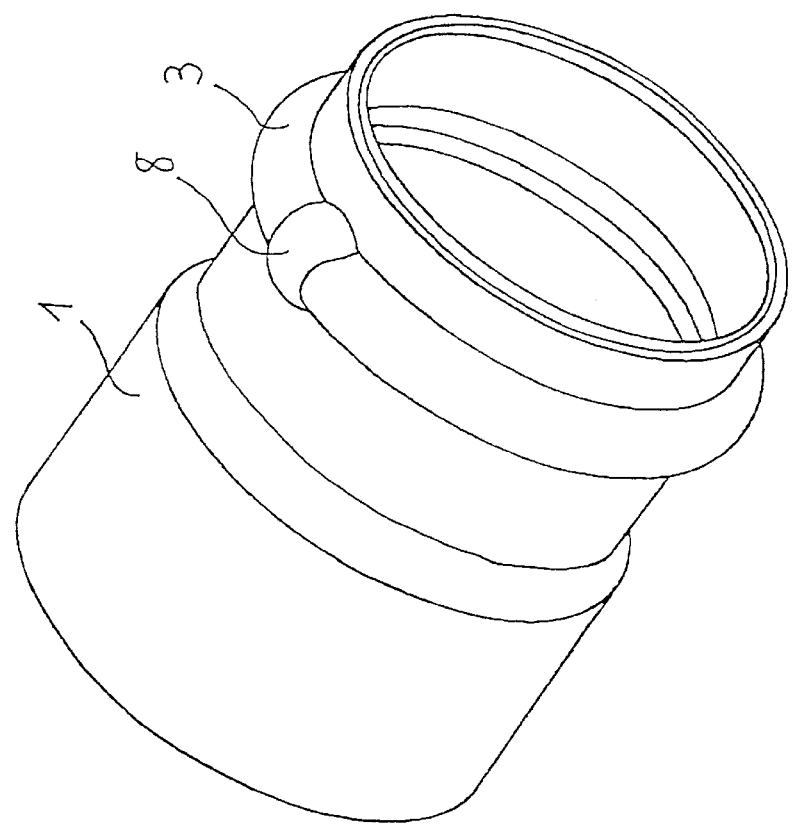
FIG. 1B is a perspective view of the fitting or of the mounting part of FIG. 1A.

A fitting or a mounting part 1 made of metal, preferably of copper, red bronze, Niro or steel, comprises an end section 2 which has a smaller wall thickness than the remaining tube-shaped component or tube 1. On the end section 2, a ring-shaped elevation 3 is formed which is adjoined by an outer section 4. The outer section 4 is used for the initial guiding of a tube or second tube 6 which is introduced into the tube-shaped component 1. The tube 6 is introduced to a stop 5 which is constructed at the transition between the end section 2 and the section of the tube-shaped component 1 with a larger wall thickness.

In the ring-shaped elevation 3, a sealing ring 7 is disposed which rests with a slight play or a slight press fit in the elevation 3 and against the tube 6 respectively. A bulge 8 is formed in the elevation 3 so that a space or groove 9 exists between the sealing ring 7 and the bulge 8. Since the tube 6 is slid into the end section 2 of the fitting or of the mounting part 1 with a slight play and a slight gap 10 forms between the end section 2 and the tube 6, fluid, air or gas in the tube-shaped component 1 or in the tube 6 can flow by way of the gap 10 in the bulge 8, space 9 and gap 10 to the outside. Should therefore a pressing-together have been forgotten after the mutual insertion, this will immediately be noticed after a filling with a fluid, with air or gas.

Figure 2:
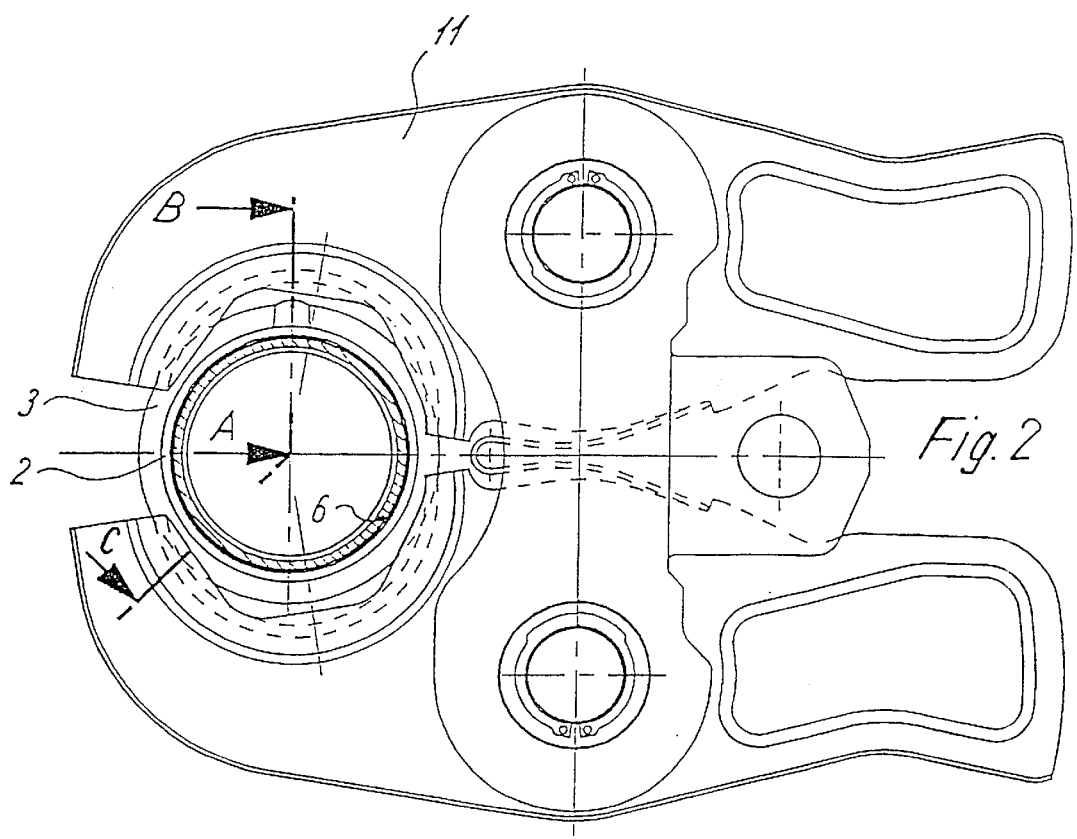
FIG. 2 is a cross-sectional view of the connection arrangement of FIG. 1A.
Figure 3:
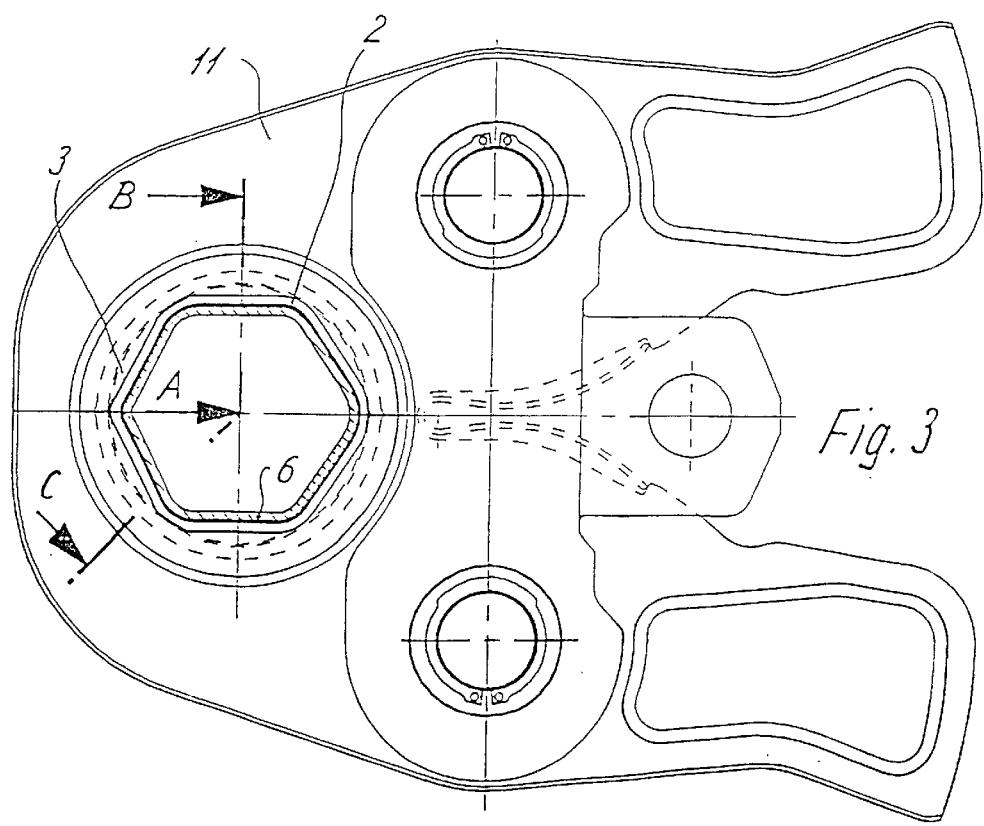
FIG. 3 is a cross-sectional view of the connection arrangement of FIG. 2 after the pressing-together.

As illustrated in FIG. 2, before the pressing-together, the bulge 8 protrudes from the end section 2. Only after the pressing-together by means of the pressing tool 11, will the bulge 8 be pressed back into the elevation 3 and a sealed-off connection will be established between the tube-shaped component 1 and the tube 6. The final contour of the connection point is illustrated in FIG. 3.

Figure 4:
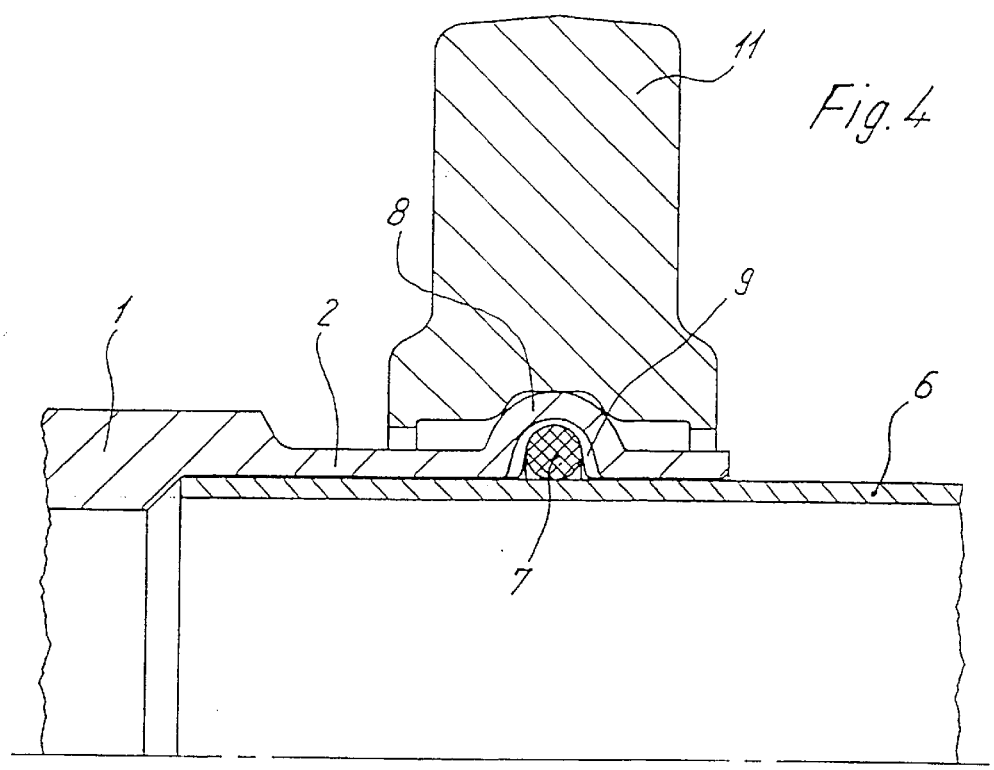
FIG. 4 is a sectional view along Line A–B of FIG. 2.
Figure 5:
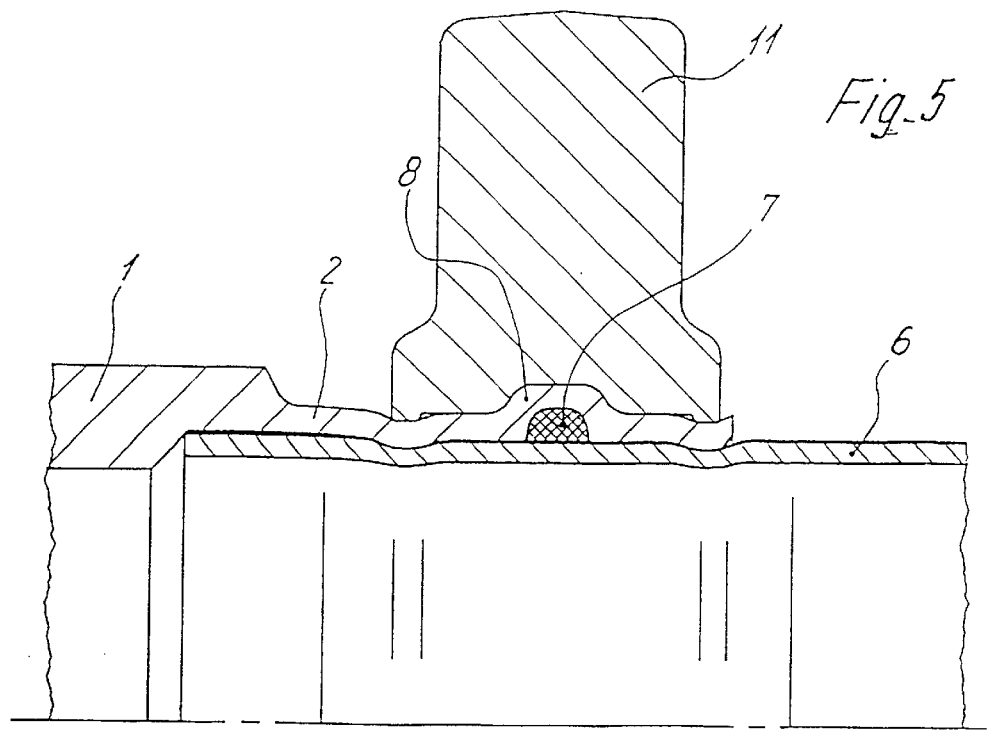
FIG. 5 is a sectional view along Line A–B of FIG. 3.

The deforming of the bulge 8 by means of the 30 pressing tool 11 is shown in FIG. 4 (not pressed together) and in FIG. 5 (pressed together). By means of the pressing tool, the gap 9 is eliminated between the bulge 8 and the sealing ring 7, and additionally, the sealing ring 7 is pressed firmly 35 against the tube 6. As a result of the irreversibility of the pressing operation, the established pressed connection is also suitable for high pressures.

Figure 6:
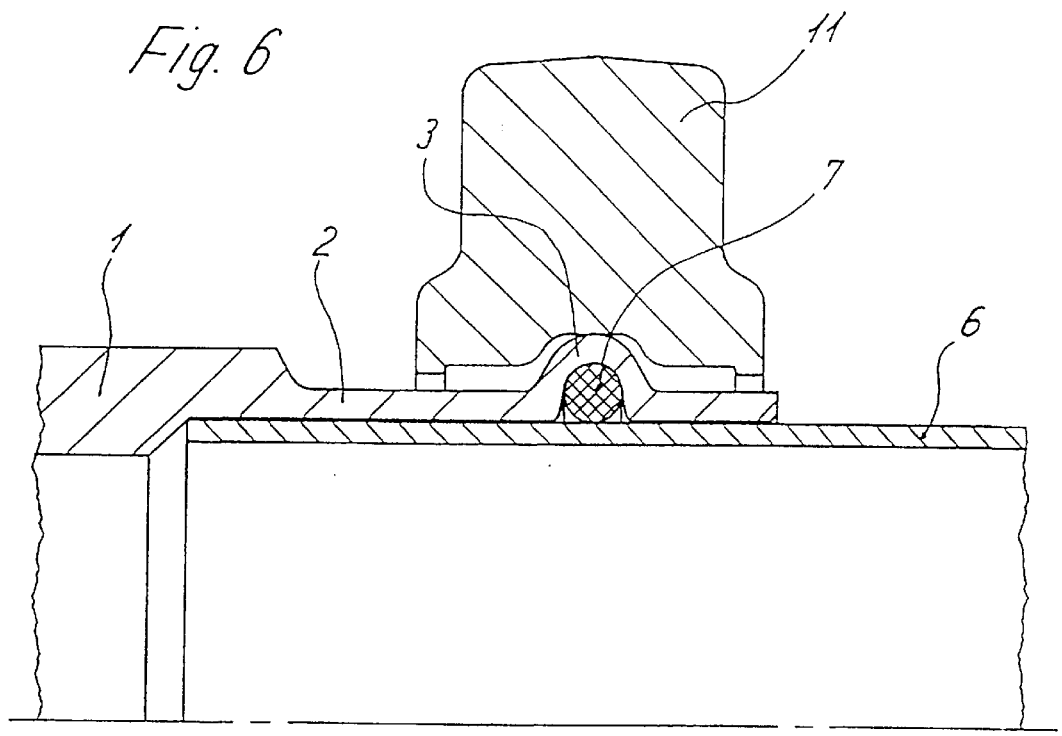
FIG. 6 is a sectional view along Line A–C of FIG. 2.
Figure 7:
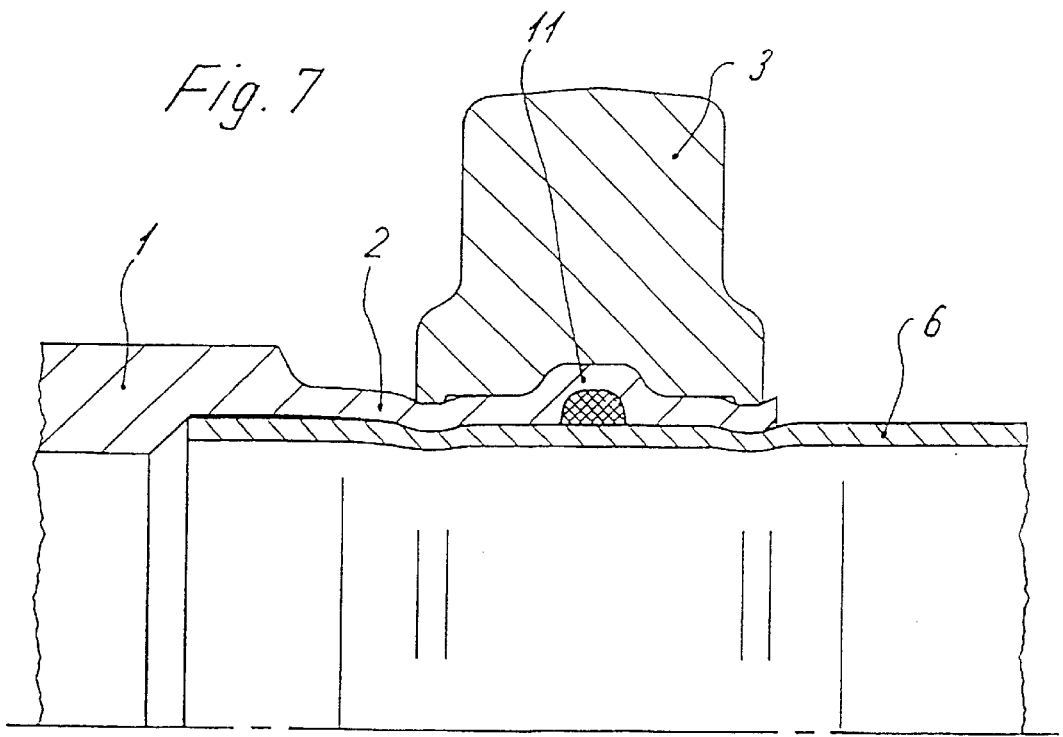
FIG. 7 is a sectional view along Line A–C of FIG. 3.

The pressing operation of the elevation 3 outside the bulge 8 is illustrated in FIG. 6 (not pressed together) and in FIG. 7 (pressed together). Also at these points, the sealing ring 7 together with the end section 2 and the tube 6 is deformed such that a sealed-off connection is established.

Figure 8:
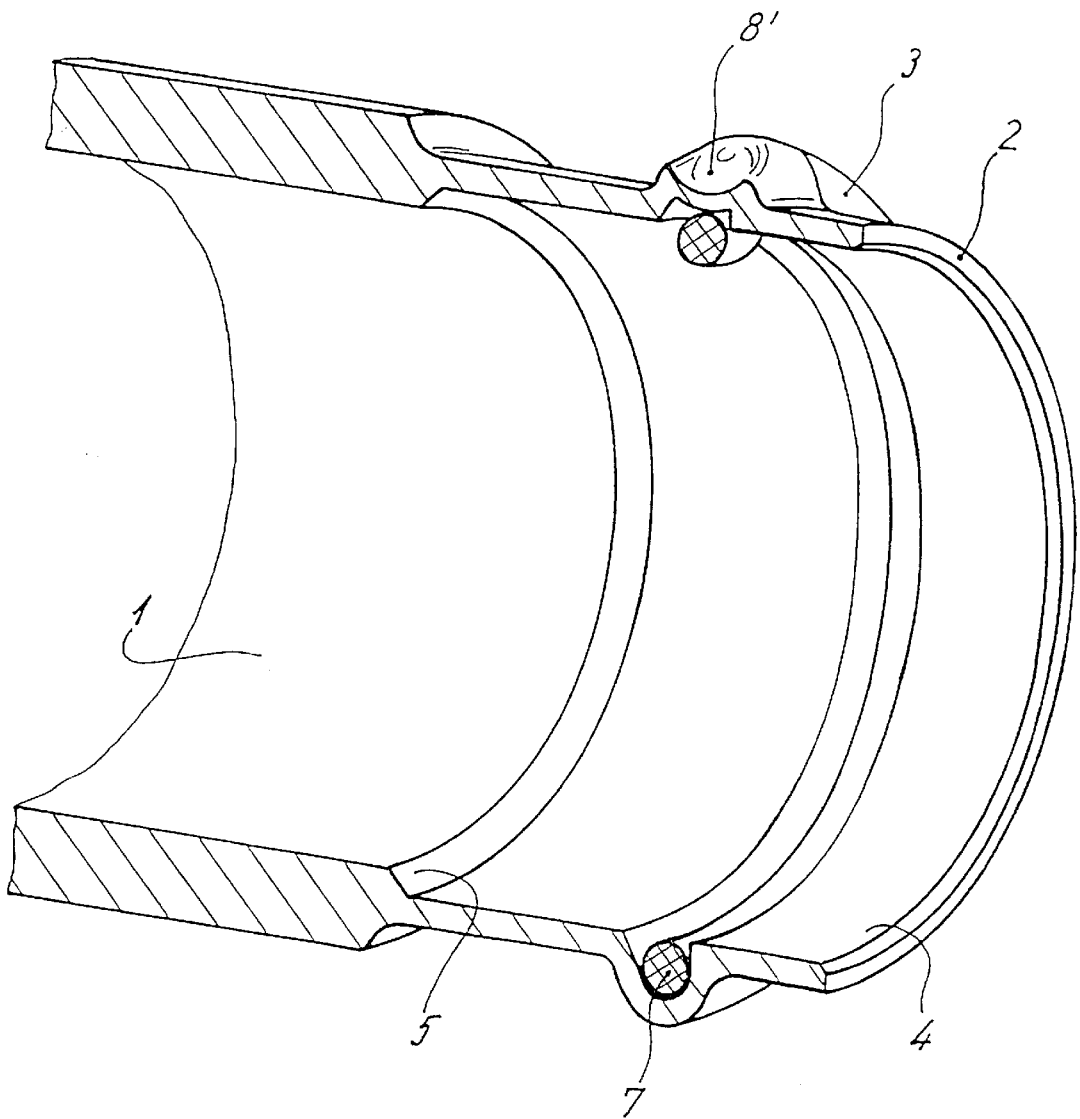
FIG. 8 is a perspective sectional view of a tube-shaped component according to a second embodiment.
Figure 10:
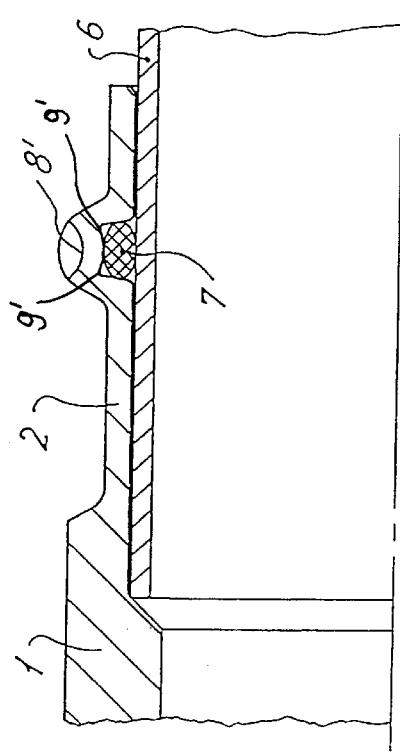
FIG. 10 is a sectional view along line A–B of FIG. 9.
Figure 11:
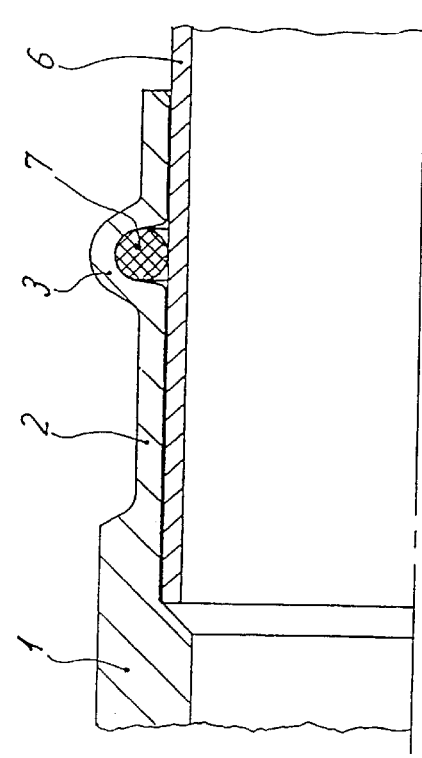
FIG. 11 is a sectional view along Line A–C of FIG. 9.
Figure 9:
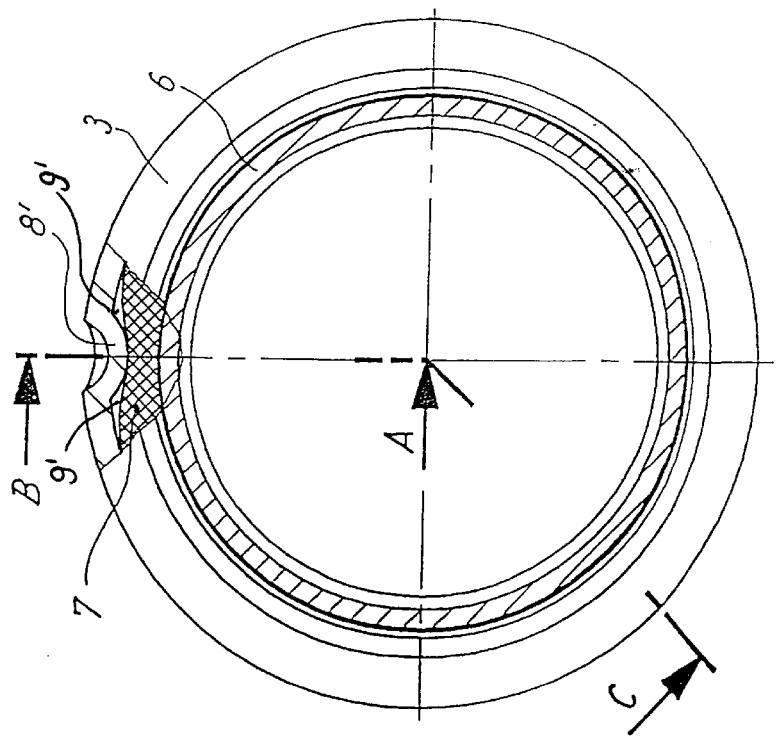
FIG. 9 is a cross-sectional view of the tube-shaped component according to FIG. 8.

FIG. 8 illustrates a second embodiment of a tube-shaped component 1 according to the invention. A ring-shaped elevation 3 is formed on the thin-walled end section 2 of the tube-shaped component 1, in which ring-shaped elevation 3 a sealing ring 7 is received. A bulge 8' is shaped into the elevation 3 which presses the sealing ring 7 radially toward the interior. As illustrated in FIG. 9, gaps 9' between the elevation 3 and the sealing ring 7 are formed on both sides of the bulge 8'. The shape of the sealing ring 7 in the elevation 3 is illustrated in FIGS. 10 and 11. When the end section 2 is pressed together, the area adjacent to the bulge 8' is pressed radially toward the interior and is permanently deformed so that the gap 9' between the sealing ring 7 and the elevation 3 disappears. By the pressing-together, a sealed-off connection is therefore established between the tube-shaped component 1 and the tube 6.

In the illustrated embodiments, only one bulge 8, 8' per tube-shaped component is provided. It is also possible to form two or more bulges 8, 8' on the elevation 3. Instead of having the spherical construction, the bulge 8, 8' may also have a different shape.

Figure 12:
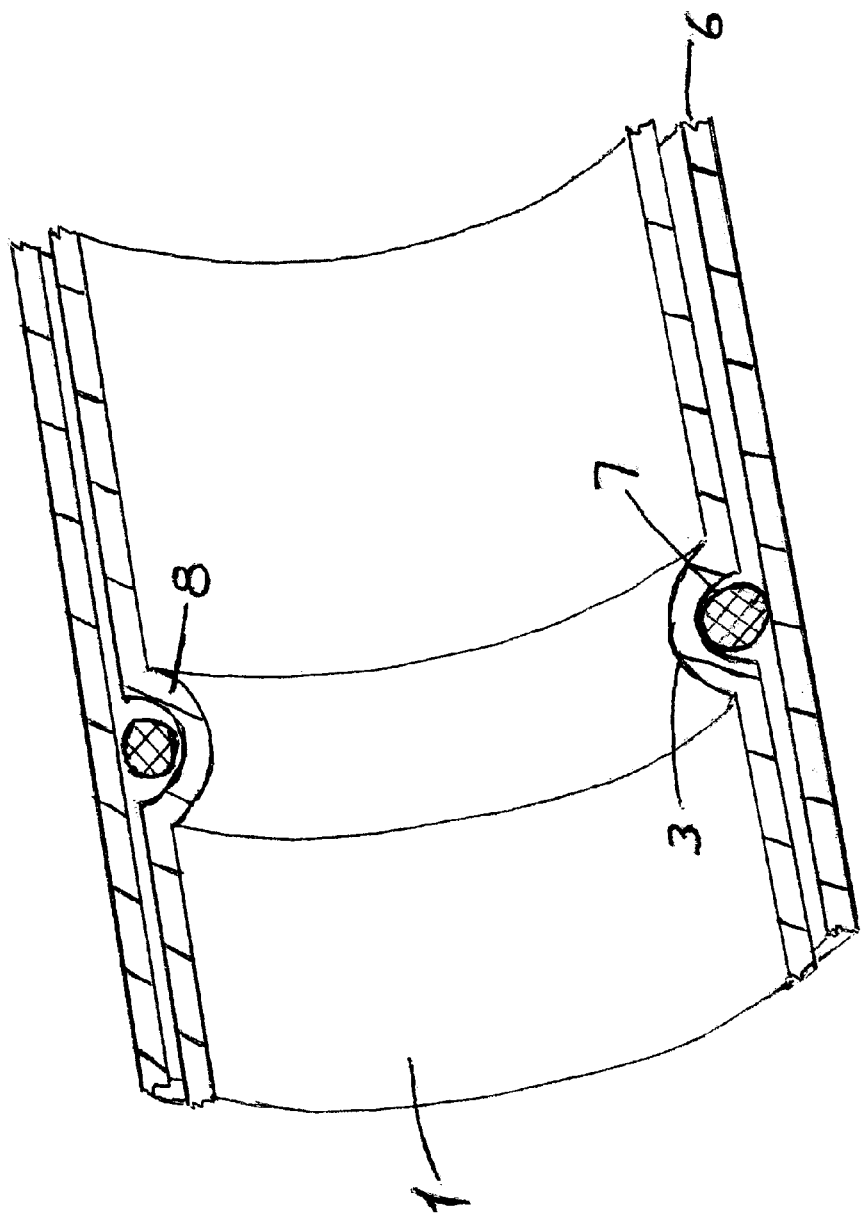
FIG. 12 is a perspective sectional view of another embodiment of a fitting or mounting part according to the invention for establishing a connection arrangement, in the unpressed condition.

According to another embodiment (FIG. 12), a ring=shaped elevation 3 is formed in the interior tube 1 on which a tube-shaped component 6 is fitted. In this case, at least one bulge 8 for producing a leaky spot is provided on the interior tube 1.

The bulge 8 could have one of the following shapes: spherical, truncated cone, pyramids, notch, slot or bit.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A fitting or mounting part comprising:
    an end section which can be pressed together with a tube-shaped component for establishing a connection;
    a ring-shaped elevation on the end section forming a groove;
    a sealing ring in the elevation groove;
    at least one bulge on the elevation changing a depth of the groove at the bulge; and
    wherein the bulge is shaped in radially toward the inside of the elevation.

2. A fitting or mounting part according to claim 1, wherein in the area of the bulge, a space exists between the sealing ring and the wall of the end section.

3. A fitting or mounting part according to claim 1, wherein the bulge has the shape of one of a spherical section, a truncated cone, pyramides, notches, slots, or a bit.

4. Connection arrangement between a fitting or a mounting part and a tube-shaped component which by way of a sealing ring are held in a sealed manner on one another, wherein the fitting or the mounting part is provided according to claim 1.

5. A fitting or mounting part comprising:
    an end section which can be pressed together with a tube-shaped component for establishing a connection;
    a ring-shaped elevation on the end section forming a groove;
    a sealing ring in the elevation groove;
    at least one bulge on the elevation changing a depth of the groove at the bulge; and
    wherein the bulge is shaped to create a leak when the end section receives the tube-shaped component before being pressed together.

6. A fitting or mounting part according to claim 5, wherein the bulge is shaped radially toward the outside of the elevation.

7. A fitting or mounting part according to claim 5, wherein in the area of the bulge, a space exists between the sealing ring and the wall of the end section.

8. A fitting or mounting part according to claim 5, wherein the bulge has the shape of one of a spherical section, a truncated cone, pyramides, notches, slots, or a bit.

9. Connection arrangement between a fitting or a mounting part and a tube-shaped component which by way of a sealing ring are held in a sealed manner on one another, wherein the fitting or the mounting part is provided according to claim 5.

10. A tube comprising:
    an end section;
    a ring-shaped elevation on the end section;
    a sealing ring in the elevation; and
    at least one bulge on the elevation providing a leak between the tube and a second tube received by the end section before the two tubes are pressed together.

11. A tube according to claim 10, wherein the elevation is on an exterior of the tube and the sealing ring is on an interior of the tube.

12. A tube according to claim 10, wherein the elevation is in an interior of the tube and the sealing ring is on an exterior of the tube.

13. A tube according to claim 10, wherein the bulge radially extends the elevation.

14. A tube according to claim 10, wherein the bulge radially diminishes the elevation.

* * * * *